US012077009B2

(12) United States Patent
Shuto et al.

(10) Patent No.: US 12,077,009 B2
(45) Date of Patent: Sep. 3, 2024

(54) REVERSIBLE RECORDING MEDIUM AND EXTERIOR MEMBER

(71) Applicant: Sony Corporation, Tokyo (JP)

(72) Inventors: Aya Shuto, Tokyo (JP); Yuriko Kaino, Tokyo (JP)

(73) Assignee: Sony Corporation, Tokyo (JP)

(*) Notice: Subject to any disclaimer, the term of this patent is extended or adjusted under 35 U.S.C. 154(b) by 819 days.

(21) Appl. No.: 17/256,896

(22) PCT Filed: May 29, 2019

(86) PCT No.: PCT/JP2019/021297
§ 371 (c)(1),
(2) Date: Dec. 29, 2020

(87) PCT Pub. No.: WO2020/003868
PCT Pub. Date: Jan. 2, 2020

(65) Prior Publication Data

US 2021/0316563 A1 Oct. 14, 2021

(30) Foreign Application Priority Data

Jun. 29, 2018 (JP) ................................. 2018-123919

(51) Int. Cl.
*B41M 5/30* (2006.01)
*B41M 5/323* (2006.01)
(Continued)

(52) U.S. Cl.
CPC ............ *B41M 5/305* (2013.01); *B41M 5/323* (2013.01); *B41M 5/3335* (2013.01); *B41M 5/42* (2013.01);
(Continued)

(58) Field of Classification Search
CPC ...... B41M 5/305; B41M 5/323; B41M 5/333; B41M 5/3335; B41M 5/34; B41M 5/42;
(Continued)

(56) References Cited

U.S. PATENT DOCUMENTS

2010/0197492 A1* 8/2010 Kawahara ............. B41M 5/426 503/201

FOREIGN PATENT DOCUMENTS

JP H07-242064 A 9/1995
JP H0952445 A 2/1997
(Continued)

OTHER PUBLICATIONS

International Search Report mailed Jul. 30, 2019 issued in connection with PCT/JP2019/021297.

*Primary Examiner* — Gerard Higgins
(74) *Attorney, Agent, or Firm* — K&L Gates LLP

(57) ABSTRACT

A reversible recording medium according to an embodiment of the present disclosure includes: a recording layer including a coloring compound having an electron-donating property, a color developing/quenching agent having an electron-accepting property, a photothermal conversion agent, and a macromolecular material; and an ultraviolet absorbing layer provided on the recording layer, the macromolecular material including an organic material that has solubility of 20 wt % or more and 80 wt % or less at 25° C. or less and contains 0.5 wt % or less of chlorine atoms, fluorine atoms, and sulfur atoms in a molecule.

15 Claims, 8 Drawing Sheets

(51) Int. Cl.
*B41M 5/333* (2006.01)
*B41M 5/337* (2006.01)
*B41M 5/42* (2006.01)
*B41M 5/34* (2006.01)

(52) U.S. Cl.
CPC ......... *B41M 5/3372* (2013.01); *B41M 5/3375* (2013.01); *B41M 5/34* (2013.01); *B41M 2205/04* (2013.01); *B41M 2205/40* (2013.01); *B41M 2205/42* (2013.01)

(58) Field of Classification Search
CPC .......... B41M 2205/04; B41M 2205/36; B41M 2205/40; B41M 2205/42
See application file for complete search history.

(56) References Cited

FOREIGN PATENT DOCUMENTS

| | | | | |
|---|---|---|---|---|
| JP | H10291369 | A | | 11/1998 |
| JP | H10315623 | A | | 12/1998 |
| JP | H10315625 | A | | 12/1998 |
| JP | 2000-185470 | A | | 7/2000 |
| JP | 2001-071646 | A1 | | 3/2001 |
| JP | 2001-105731 | A | | 4/2001 |
| JP | 2011-098536 | A | | 5/2001 |
| JP | 2003-145940 | A | | 5/2003 |
| JP | 2004160806 | A | * | 6/2004 |
| JP | 2004168024 | A | | 6/2004 |
| JP | 2006150943 | A | | 6/2006 |
| JP | 2007-098735 | A | | 4/2007 |
| JP | 2011235588 | A | | 11/2011 |
| WO | 2018/092488 | A1 | | 5/2018 |
| WO | WO-2018/092455 | A1 | | 10/2019 |

* cited by examiner

[ FIG. 1 ]
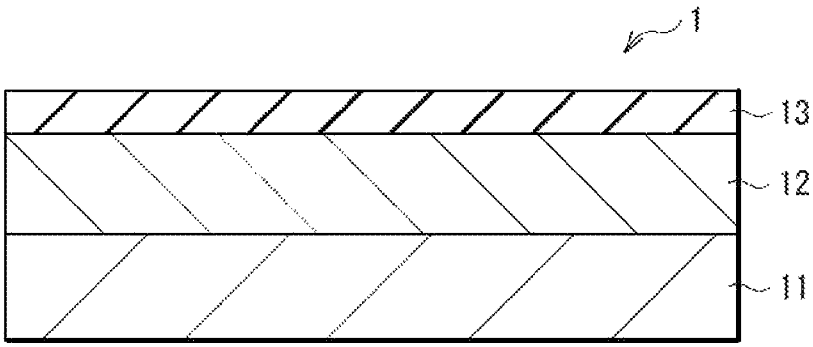
[ FIG. 2 ]
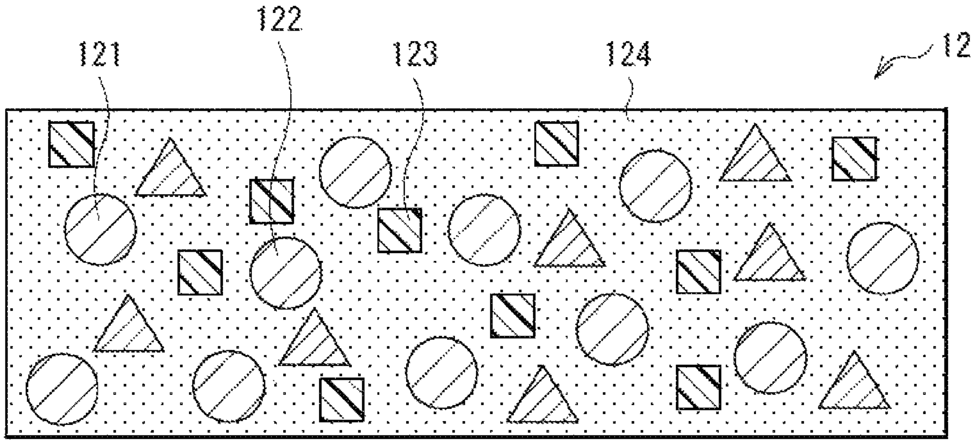
[ FIG. 3 ]
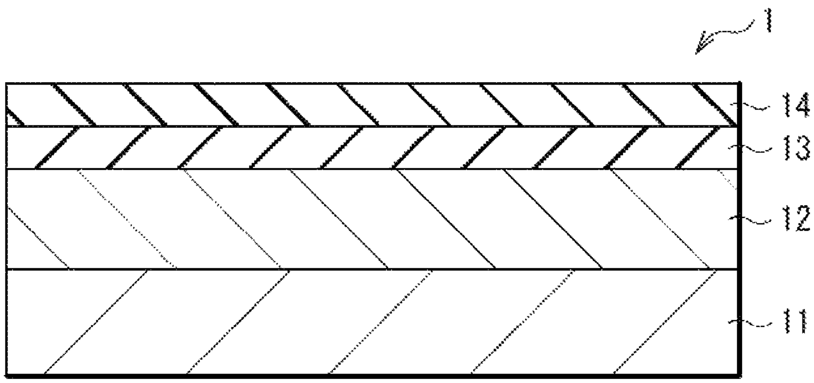

[ FIG. 4 ]
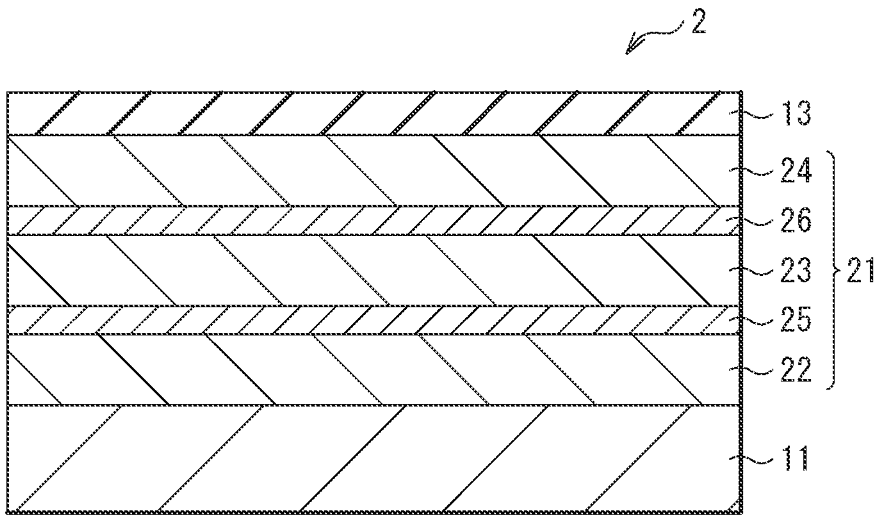
[ FIG. 5 ]
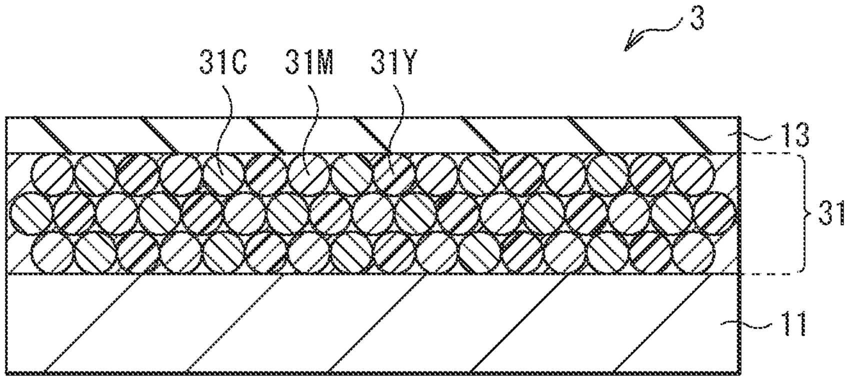

【FIG. 6A】
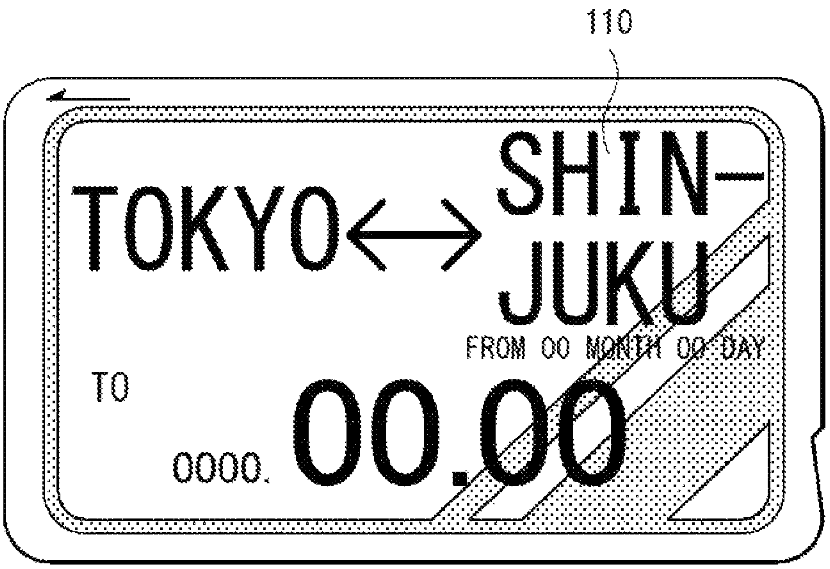
【FIG. 6B】
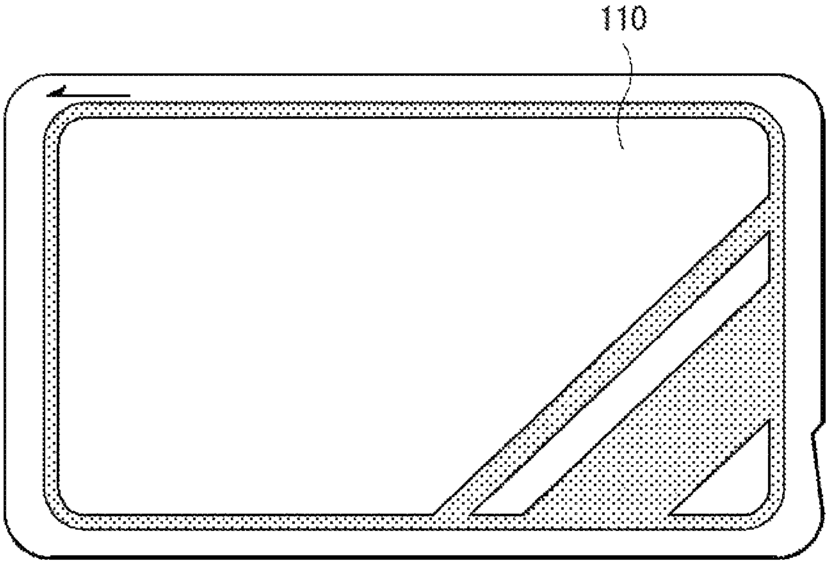

[ FIG. 7A ]
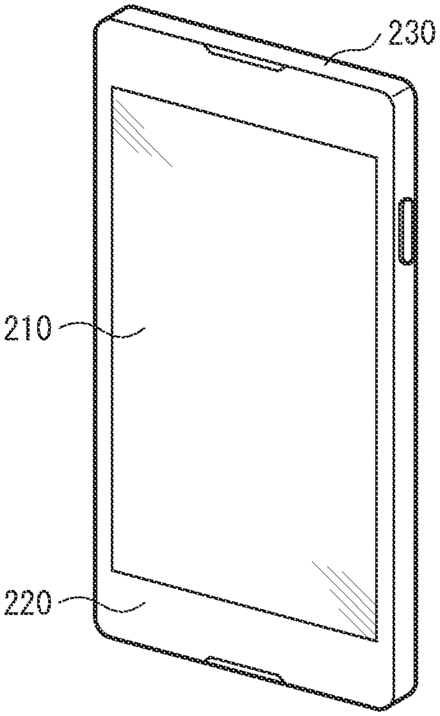
[ FIG. 7B ]
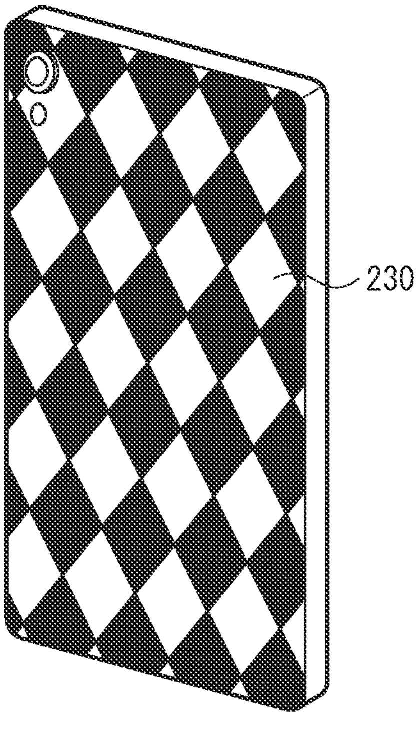

[ FIG. 8A ]
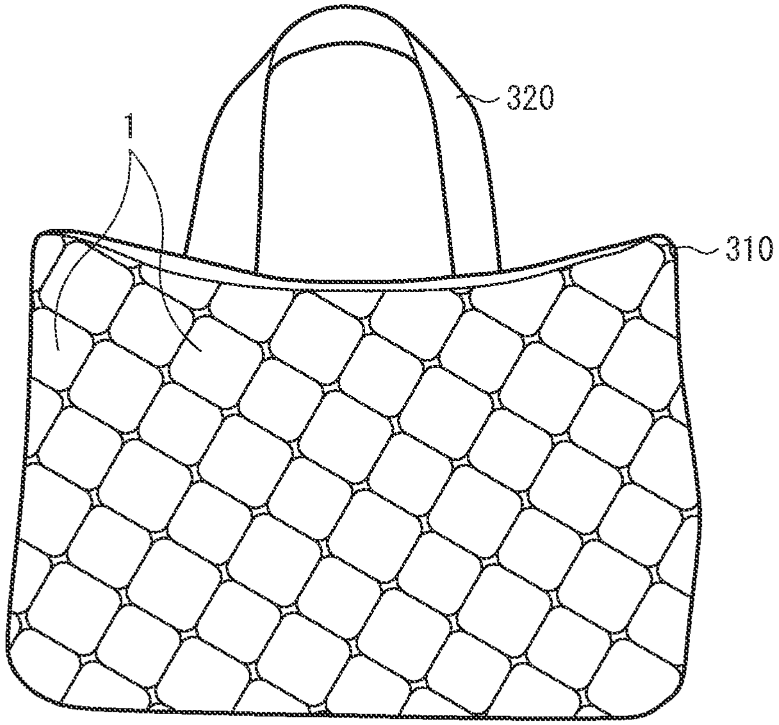
[ FIG. 8B ]

【 FIG. 9 】
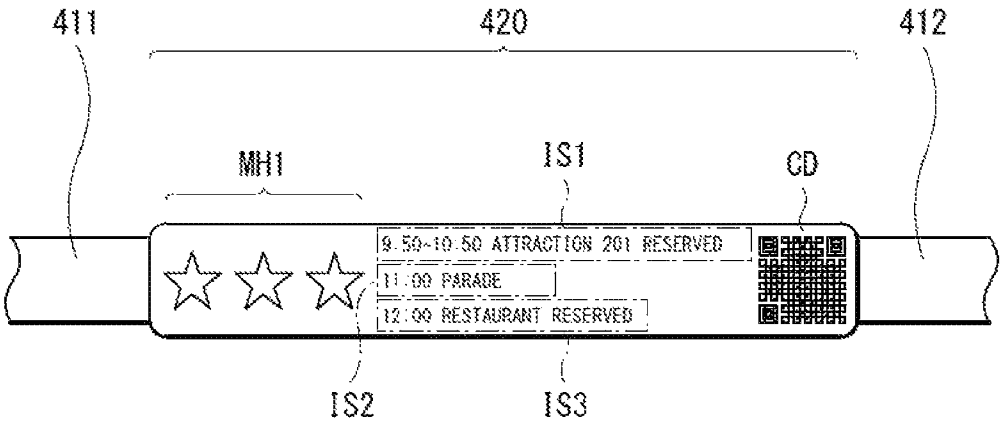

[ FIG. 10A ]
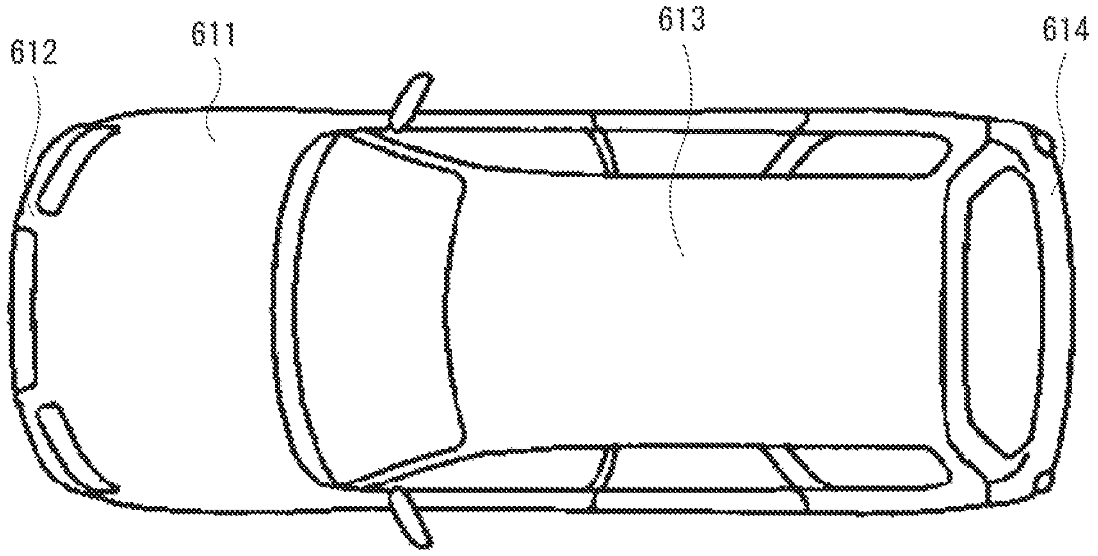
[ FIG. 10B ]
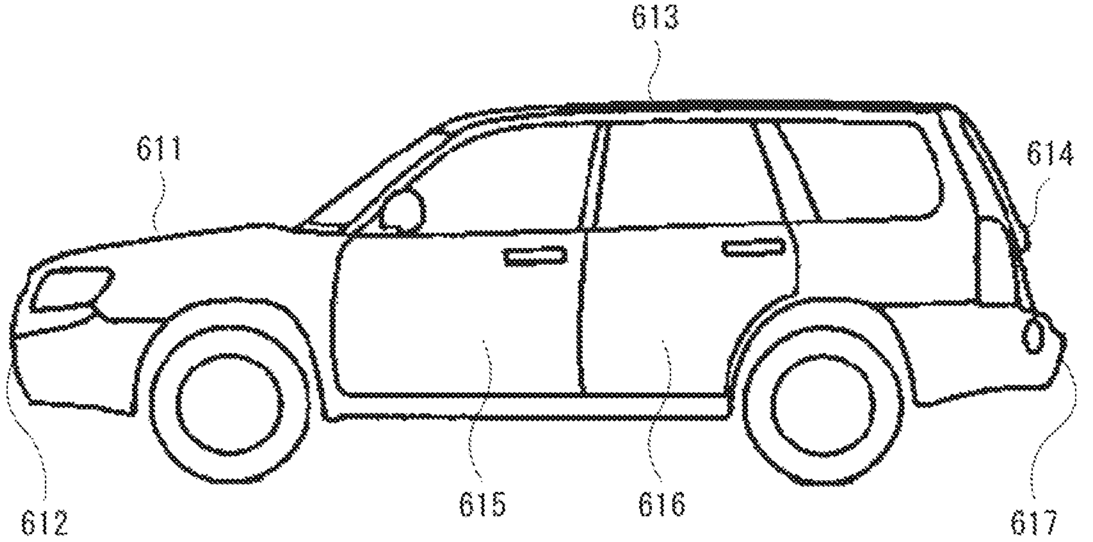

【 FIG. 11 】
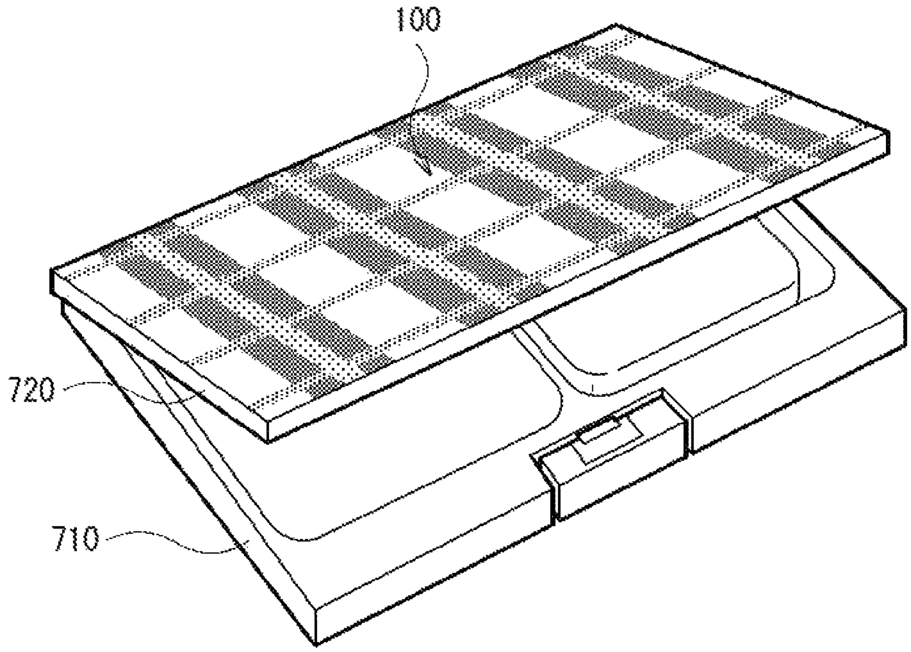

REVERSIBLE RECORDING MEDIUM AND EXTERIOR MEMBER

TECHNICAL FIELD

The present disclosure relates to a reversible recording medium that allows for recording and deletion of, for example, an image, and an exterior member provided therewith.

BACKGROUND ART

Recently, necessity of a rewritable recording technique has been recognized from the viewpoint of global environment. For example, development has been in progress in a recording medium that enables information to be recorded and deleted reversibly by heat, i.e., a so-called reversible recording medium, as an example of a display medium that replaces a printed matter.

As the reversible recording medium, for example, development has been in progress in a reversible recording medium using a leuco pigment as a color developer; however, there is an issue that a background (a color-undeveloped part) is colored in a light resistance test, resulting in a deterioration in display quality. As countermeasures against this issue, for example, PTL 1 discloses a reversible recording medium having durability against light enhanced by providing a layer including an ultraviolet absorbing agent.

CITATION LIST

Patent Literature

PTL 1: Japanese Unexamined Patent Application Publication No. 2000-185470

SUMMARY OF THE INVENTION

As described above, in a reversible recording medium, an improvement in durability of display quality is desired.

It is desirable to provide a reversible recording medium and an exterior member that make it possible to improve durability of display quality.

A reversible recording medium according to an embodiment of the present disclosure includes: a recording layer including a coloring compound having an electron-donating property, a color developing/quenching agent having an electron-accepting property, a photothermal conversion agent, and a macromolecular material; and an ultraviolet absorbing layer provided on the recording layer, the macromolecular material including an organic material that has solubility of 20 wt % or more and 80 wt % or less at 25° C. or less and contains 0.5 wt % or less of chlorine atoms, fluorine atoms, and sulfur atoms in a molecule.

An exterior member according to an embodiment of the present disclosure is provided with the above-described reversible recording medium according to the embodiment of the present disclosure on at least one surface of a support base.

In the reversible recording medium according to the embodiment of the present disclosure and the exterior member according to the embodiment of the present disclosure, in the recording layer including the coloring compound, the color developing/quenching agent, the photothermal conversion agent, and the macromolecular material, the organic material that has solubility of 20 wt % or more and 80 wt % or less at 25° C. or less and contains 0.5 wt % or less of chlorine atoms, fluorine atoms, and sulfur atoms in a molecule is used as the macromolecular material. This reduces coloring of a color-undeveloped part.

According to the reversible recording medium according to the embodiment of the present disclosure and the exterior member according to the embodiment of the present disclosure, the organic material that has solubility of 20 wt % or more and 80 wt % or less at 25° C. or less and contains 0.5 wt % or less of chlorine atoms, fluorine atoms, and sulfur atoms in a molecule is used as the macromolecular material forming the recording layer, which reduces coloring of a color-undeveloped part. This makes it possible to improve durability of display quality.

It is to be noted that the effects described here are not necessarily limitative, and may be any of the effects described in the present disclosure.

BRIEF DESCRIPTION OF DRAWINGS

FIG. 1 is a schematic cross-sectional view of an example of a configuration of a reversible recording medium according to an embodiment of the present disclosure.

FIG. 2 is an explanatory schematic view of a configuration of a recording layer illustrated in FIG. 1.

FIG. 3 is a schematic cross-sectional view of another example of the configuration of the reversible recording medium according to the embodiment of the present disclosure.

FIG. 4 is a schematic cross-sectional view of an example of a configuration of a reversible recording medium according to a modification example 1 of the present disclosure.

FIG. 5 is a schematic cross-sectional view of an example of a configuration of a reversible recording medium according to a modification example 2 of the present disclosure.

FIG. 6A is a perspective view of an example of an appearance of an application example 1.

FIG. 6B is a perspective view of another example of the appearance of the application example 1.

FIG. 7A is a perspective view of an example of an appearance (on front side) of an application example 2.

FIG. 7B is a perspective view of an example of an appearance (on rear side) of the application example 2.

FIG. 8A is a perspective view of an example of an appearance of an application example 3.

FIG. 8B is a perspective view of another example of the appearance of the application example 3.

FIG. 9 is an explanatory diagram illustrating a configuration example of an application example 4.

FIG. 10A is a perspective view of an example of an appearance (an upper surface) of an application example 5.

FIG. 10B is a perspective view of an example of an appearance (a side surface) of the application example 5.

FIG. 11 is a perspective view of an example of an appearance of an application example 6.

MODES FOR CARRYING OUT THE INVENTION

In the following, some embodiments of the present disclosure are described in detail with reference to the drawings. The following description is directed to specific examples of the present disclosure, and the present disclosure is not limited to the following embodiments. In addition, the present disclosure is not limited to the arrangement, dimensions, dimensional ratios, and the like of respective components illustrated in the drawings. It is to be noted that description is given in the following order.

1. Embodiment (An example in which a recording layer uses a macromolecular material that has predetermined solubility and contains 0.5 wt % or less of chlorine atoms, fluorine atoms, and sulfur atoms in a molecule)
   - 1-1. Configuration of Reversible Recording Medium
   - 1-2. Manufacturing Method of Reversible Recording Medium
   - 1-3. Recording and Deletion Methods of Reversible Recording Medium
   - 1-4. Workings and Effects
2. Modification Examples
   - 2-1. Modification Example 1 (An example in which a plurality of recording layers is stacked)
   - 2-2. Modification Example 2 (An example in which a plurality of types of coloring compounds is included in a recording layer)
3. Application Examples
4. Working Examples

1. Embodiment

FIG. 1 illustrates a cross-sectional configuration of a reversible recording medium (a reversible recording medium 1) according to an embodiment of the present disclosure. FIG. 2 schematically illustrates respective materials included in a recording layer 12. The reversible recording medium 1 includes, for example, the recording layer 12 that is disposed on a support base 11 and allows for reversible change between a recorded state and a deleted state.

1-1. Configuration of Reversible Recording Medium

The reversible recording medium 1 according to the present embodiment includes the recording layer 12 that includes, for example, a coloring compound 121, a color developing/quenching agent 122, a photothermal conversion agent 123, and a macromolecular material 124. An organic material that has solubility of 20 wt % or more and 80 wt % or less at 25° C. or less and contains 0.5 wt % or less of chlorine atoms, fluorine atoms, and sulfur atoms in a molecule is used as the macromolecular material 124. In the present embodiment, a UV barrier layer 13 is further provided on the recording layer 12.

The support base 11 serves to support the recording layer 12. The support base 11 includes a material having superior heat resistance as well as superior size stability in a planar direction. The support base 11 may have a property of either light transmissivity or non-light transmissivity. For example, the support base 11 either may be a substrate having rigidity, such as a wafer, or may include flexible thin layer glass, film, paper, or the like. The use of a flexible substrate as the support base 11 allows for achievement of a flexible (foldable) reversible recording medium.

The support base 11 serves to support the recording layer 12. The support base 11 includes a material having superior heat resistance as well as superior size stability in a planar direction. The support base 11 may have a property of either light transmissivity or non-light transmissivity. For example, the support base 11 either may be a substrate having rigidity, such as a wafer, or may include flexible thin layer glass, film, paper, or the like. The use of a flexible substrate as the support base 11 allows for achievement of a flexible (foldable) reversible recording medium.

Examples of a constituent material of the support base 11 include an inorganic material, a metal material, and a macromolecular material such as plastic. Specific examples of the inorganic material include silicon (Si), silicon oxide ($SiO_x$), silicon nitride ($SiN_x$), aluminum oxide ($AlO_x$), magnesium oxide ($MgO_x$), and the like. The silicon oxide includes glass, spin-on-glass (SOG), or the like. Examples of the metal material include metal elements such as aluminum (Al), copper (Cu), silver (Ag), gold (Au), platinum (Pt), palladium (Pd), nickel (Ni), tin (Sn), cobalt (Co), rhodium (Rh), iridium (Ir), iron (Fe), ruthenium (Ru), osmium (Os), manganese (Mn), molybdenum (Mo), tungsten (W), niobium (Nb), tantalum (Ta), titanium (Ti), bismuth (Bi), antimony (Sb), and lead (Pb), or an alloy containing two or more of those. Specific examples of the alloy include stainless steel (SUS), an aluminum alloy, a magnesium alloy, a titanium alloy, and the like. Examples of the macromolecular material include a phenol resin, an epoxy resin, a melamine resin, a urea resin, an unsaturated polyester resin, an alkyd resin, a urethane resin, polyimide, polyethylene, high-density polyethylene, medium-density polyethylene, low-density polyethylene, polypropylene, polyvinyl chloride (PVC), polyvinylidene chloride, polystyrene, polyvinyl acetate, polyurethane, an acrylonitrile butadiene styrene resin (ABS), an acrylic resin (PMMA), polyamide, nylon, polyacetal, polycarbonate (PC), modified polyphenylene ether, polyethylene terephthalate (PET), polybutylene terephthalate, cyclic polyolefin, polyphenylene sulfide, polytetrafluoroethylene (PTFE), polysulfone, polyethersulfone, non-crystalline polyarylate, liquid crystal polymer, polyether ether ketone (PEEK), polyamide imide, polyethylene naphthalate (PEN), and triacetyl cellulose, cellulose, or a copolymer thereof, glass-fiber reinforced plastic, carbon-fiber reinforced plastic (CFRP), and the like.

It is to be noted that an upper surface or a lower surface of the support base 11 may be provided with a reflective layer (not illustrated). The provision of the reflective layer allows for more vivid color display.

The recording layer 12 enables information to be recorded and deleted reversibly by heat, and is configured using a material that allows for stable repeated recording and allows for control of a decolored state and a color-developed state. Specifically, the recording layer 12 is formed by dispersing the coloring compound 121, the color developing/quenching agent 122, and the photothermal conversion agent 123 in, for example, the macromolecular material 124, as described above. A film thickness (hereinafter, simply referred to as thickness) of the recording layer 12 is 1 μm or more and 10 μm or less, for example.

Examples of the coloring compound 121 include a leuco pigment. Examples of the leuco pigment include an existing pigment for heat-sensitive paper. A specific example thereof includes a compound that contains, in a molecule, a group having an electron-donating property and is represented by the following formula (2).

[Chem. 1]

(2)

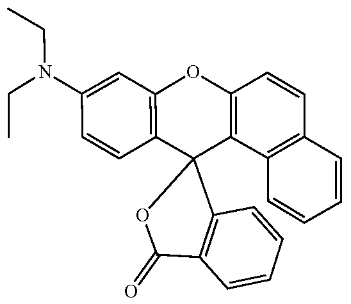

The coloring compound 121 is not particularly limited, and is appropriately selectable in accordance with a purpose. Specific examples of the coloring compound include, in addition to the compound represented by the above-described formula (2), a fluoran-based compound, a triphenylmethane phthalide-based compound, an azaphthalide-based compound, a phenothiazine-based compound, a leuco auramine-based compound, an indolinophthalide-based compound, and the like. Other examples include 2-anilino-3-methyl-6-diethylaminofluoran, 2-anilino-3-methyl-6-di(n-butylamino)fluoran, 2-anilino-3-methyl-6-(N-n-propyl-N-methylamino)fluoran, 2-anilino-3-methyl-6-(N-isopropyl-N-methylamino)fluoran, 2-anilino-3-methyl-6-(N-isobutyl-N-methylamino)fluoran, 2-anilino-3-methyl-6-(N-n-amyl-N-methylamino)fluoran, 2-anilino-3-methyl-6-(N-sec-butyl-N-methylamino)fluoran, 2-anilino-3-methyl-6-(N-n-amyl-N-ethylamino)fluoran, 2-anilino-3-methyl-6-(N-iso-amyl-N-ethylamino)fluoran, 2-anilino-3-methyl-6-(N-n-propyl-N-isopropylamino)fluoran, 2-anilino-3-methyl-6-(N-cyclohexyl-N-methylamino)fluoran, 2-anilino-3-methyl-6-(N-ethyl-p-toluidino)fluoran, 2-anilino-3-methyl-6-(N-methyl-p-toluidino)fluoran, 2-(m-trichloromethylanilino)-3-methyl-6-diethylaminofluoran, 2-(m-trifluoromethylanilino)-3-methyl-6-diethylaminofluoran, 2-(m-trichloromethylanilino)-3-methyl-6-(N-cyclohexyl-N-methylamino)fluoran, 2-(2,4-dimethylanilino)-3-methyl-6-diethylaminofluoran, 2-(N-ethyl-p-toluidino)-3-methyl-6-(N-ethylanilino)fluoran, 2-(N-ethyl-p-toluidino)-3-methyl-6-(N-propyl-p-toluidino)fluoran, 2-anilino-6-(N-n-hexyl-N-ethylamino)fluoran, 2-(o-chloroanilino)-6-diethylaminofluoran, 2-(o-chloroanilino)-6-dibutylaminofluoran, 2-(m-trifluoromethylanilino)-6-diethylaminofluoran, 2,3-dimethyl-6-dimethylaminofluoran, 3-methyl-6-(N-ethyl-p-toluidino)fluoran, 2-chloro-6-diethylaminofluoran, 2-bromo-6-diethylaminofluoran, 2-chloro-6-dipropylaminofluoran, 3-chloro-6-cyclohexylaminofluoran, 3-bromo-6-cyclohexylaminofluoran, 2-chloro-6-(N-ethyl-N-isoamylamino)fluoran, 2-chloro-3-methyl-6-diethylaminofluoran, 2-anilino-3-chloro-6-diethylaminofluoran, 2-(o-chloroanilino)-3-chloro-6-cyclohexylaminofluoran, 2-(m-trifluoromethylanilino)-3-chloro-6-diethylaminofluoran, 2-(2,3-dichloroanilino)-3-chloro-6-diethylaminofluoran, 1,2-benzo-6-diethylaminofluoran, 3-diethylamino-6-(m-trifluoromethylanilino)fluoran, 3-(1-ethyl-2-methylindole-3-yl)-3-(2-ethoxy-4-diethylaminophenyl)-4-azaphthalide, 3-(1-ethyl-2-methylindole-3-yl)-3-(2-ethoxy-4-diethylaminophenyl)-7-azaphthalide, 3-(1-octyl-2-methylindole-3-yl)-3-(2-ethoxy-4-diethylaminophenyl)-4-azaphthalide, 3-(1-ethyl-2-methylindole-3-yl)-3-(2-methyl-4-diethylaminophenyl)-4-azaphthalide, 3-(1-ethyl-2-methylindole-3-yl)-3-(2-methyl-4-diethylaminophenyl)-7-azaphthalide, 3-(1-ethyl-2-methylindole-3-yl)-3-(4-diethylaminophenyl)-4-azaphthalide, 3-(1-ethyl-2-methylindole-3-yl)-3-(4-N-n-amyl-N-methylaminophenyl)-4-azaphthalide, 3-(1-methyl-2-methylindole-3-yl)-3-(2-hexyloxy-4-diethylaminophenyl)-4-azaphthalide, 3,3-bis(2-ethoxy-4-diethylaminophenyl)-4-azaphthalide, 3,3-bis(2-ethoxy-4-diethylaminophenyl)-7-azaphthalide, 2-(p-acetylanilino)-6-(N-n-amyl-N-n-butylamino)fluoran, 2-benzylamino-6-(N-ethyl-p-toluidino)fluoran, 2-benzylamino-6-(N-methyl-2,4-dimethylanilino)fluoran, 2-benzylamino-6-(N-ethyl-2,4-dimethylanilino)fluoran, 2-benzylamino-6-(N-methyl-p-toluidino)fluoran, 2-benzylamino-6-(N-ethyl-p-toluidino) fluoran, 2-(di-p-methylbenzylamino)-6-(N-ethyl-p-toluidino)fluoran, 2-(α-phenylethylamino)-6-(N-ethyl-p-toluidino)fluoran, 2-methylamino-6-(N-methylanilino) fluoran, 2-methylamino-6-(N-ethylanilino)fluoran, 2-methylamino-6-(N-propylanilino)fluoran, 2-ethylamino-6-(N-methyl-p-toluidino)fluoran, 2-methylamino-6-(N-methyl-2,4-dimethylanilino)fluoran, 2-ethylamino-6-(N-ethyl-2,4-dimethylanilino)fluoran, 2-dimethylamino-6-(N-methylanilino)fluoran, 2-dimethylamino-6-(N-ethylanilino) fluoran, 2-diethylamino-6-(N-methyl-p-toluidino)fluoran, 2-diethylamino-6-(N-ethyl-p-toluidino)fluoran, 2-dipropylamino-6-(N-methylanilino)fluoran, 2-dipropylamino-6-(N-ethylanilino)fluoran, 2-amino-6-(N-methylanilino)fluoran, 2-amino-6-(N-ethylanilino)fluoran, 2-amino-6-(N-propylanilino)fluoran, 2-amino-6-(N-methyl-p-toluidino)fluoran, 2-amino-6-(N-ethyl-p-toluidino)fluoran, 2-amino-6-(N-propyl-p-toluidino)fluoran, 2-amino-6-(N-methyl-p-ethylanilino)fluoran, 2-amino-6-(N-ethyl-p-ethylanilino)fluoran, 2-amino-6-(N-propyl-p-ethylanilino)fluoran, 2-amino-6-(N-methyl-2,4-dimethylanilino)fluoran, 2-amino-6-(N-ethyl-2,4-dimethylanilino)fluoran, 2-amino-6-(N-propyl-2,4-dimethylanilino)fluoran, 2-amino-6-(N-methyl-p-chloroanilino) fluoran, 2-amino-6-(N-ethyl-p-chloroanilino)fluoran, 2-amino-6-(N-propyl-p-chloroanilino)fluoran, 1,2-benzo-6-(N-ethyl-N-isoamylamino)fluoran, 1,2-benzo-6-dibutylaminofluoran, 1,2-benzo-6-(N-methyl-N-cyclohexylamino) fluoran, 1,2-benzo-6-(N-ethyl-N-toluidino)fluoran, and the like. For the recording layer 12, as the coloring compound 121, one of the above-described compounds may be used alone, or two or more of the above-described compounds may be used in combination.

The color developing/quenching agent 122 serves, for example, to develop a color of a colorless coloring compound or to decolor a coloring compound colored in a predetermined color. Examples of the color developing/quenching agent 122 include a phenol derivative, a salicylic acid derivative, a urea derivative, and the like. Specific examples thereof include a compound having a salicylic acid skeleton represented by the following general formula (1) and containing, in a molecule, a group having an electron-accepting property.

[Chem. 2]

(1)

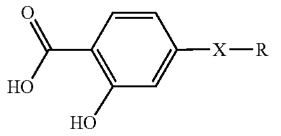

(X is one of —NHCO—, —CONH—, —NHCONH—, —CONHCO—, —NHNHCO—, —CONHNH—,

—CONNHNHCO—, —NHCOCONH—, —NHCONHCO—, —CONHCONH—, —NHNHCONH—, —NHCONHNH—, —CONHNHCONH—, —NHCONHNHCO—, and —CONHNHCONH—, and R is a linear hydrocarbon group having 25 to 34 carbon atoms.)

Other examples of the color developing/quenching agent 122 include 4,4'-isopropylidenebisphenol, 4,4'-isopropylidenebis(o-methylphenol), 4,4'-secondary butylidenebisphenol, 4,4'-isopropylidenebis(2-tertiary butylphenol), zinc p-nitrobenzoate, 1,3,5-tris(4-tertiary butyl-3-hydroxy-2,6-dimethylbenzyl)isocyanuric acid, 2,2-(3,4'-dihydroxydiphenyl)propane, bis(4-hydroxy-3-methylphenyl)sulfide, 4-{1-(p-methoxyphenoxy)ethoxy}salicylic acid, 1,7-bis(4-hydroxyphenylthio)-3,5-dioxaheptane, 1,5-bis(4-hydroxyphenylthio)-5-oxapentane, phthalic acid monobenzyl ester monocalcium salt, 4,4'-cyclohexylidenediphenol, 4,4'-isopropylidenebis(2-chlorophenol), 2,2'-methylenebis(4-methyl-6-tertiary-butylphenol), 4,4'-butylidenebis(6-tertiary-butyl-2-methyl)phenol, 1,1,3-tris(2-methyl-4-hydroxy-5-tertiary-butylphenyl)butane, 1,1,3-tris(2-methyl-4-hydroxy-5-cyclohexylphenyl)butane, 4,4'-thiobis(6-tertiary-butyl-2-methyl)phenol, 4,4'-diphenolsulfone, 4-isopropoxy-4'-hydroxydiphenylsulfone (4-hydroxy-4'-isopropoxydiphenylsulfone), 4-benzyloxy-4'-hydroxydiphenylsulfone, 4,4'-diphenolsulfoxide, isopropyl p-hydroxybenzoate, benzyl p-hydroxybenzoate, benzyl protocatechuate, stearyl gallate, lauryl gallate, octyl gallate, 1,3-bis(4-hydroxyphenylthio)-propane, N,N'-diphenylthiourea, N,N'-di(m-chlorophenyl)thiourea, salicylanilide, bis(4-hydroxyphenyl)methyl acetate, bis(4-hydroxyphenyl)benzyl acetate, 1,3-bis(4-hydroxycumyl)benzene, 1,4-bis(4-hydroxycumyl)benzene, 2,4'-diphenolsulfone, 2,2'-diallyl-4,4'-diphenolsulfone, 3,4-dihydroxyphenyl-4'-methyldiphenylsulfone, zinc 1-acetyloxy-2-naphthoate, zinc 2-acetyloxy-1-naphthoate, zinc 2-acetyloxy-3-naphthoate, α,α-bis(4-hydroxyphenyl)-α-methyltoluene, an antipyrine complex of zinc thiocyanate, tetrabromobisphenol A, tetrabromobisphenol S, 4,4'-thiobis(2-methylphenol), 4,4'-thiobis(2-chlorophenol), dodecylphosphonic acid, tetradecylphosphonic acid, hexadecylphosphonic acid, octadecylphosphonic acid, eicosylphosphonic acid, docosylphosphonic acid, tetracosylphosphonic acid, hexacosylphosphonic acid, octacosylphosphonic acid, α-hydroxydodecylphosphonic acid, α-hydroxytetradecylphosphonic acid, α-hydroxyhexadecylphosphonic acid, α-hydroxyoctadecylphosphonic acid, α-hydroxyeicosylphosphonic acid, α-hydroxydocosylphosphonic acid, α-hydroxytetracosylphosphonic acid, dihexadecyl phosphate, dioctadecyl phosphate, dieicosyl phosphate, didocosyl phosphate, monohexadecyl phosphate, monooctadecyl phosphate, monoeicosyl phosphate, monodocosyl phosphate, methylhexadecyl phosphate, methyloctadecyl phosphate, methyleicosyl phosphate, methyldocosyl phosphate, amylhexadecyl phosphate, octylhexadecyl phosphate, laurylhexadecyl phosphate, and the like. For the recording layer 12, as the color developing/quenching agent 122, one of the above-described compounds may be used alone, or two or more of the above-described compounds may be used in combination.

The photothermal conversion agent 123 serves, for example, to absorb light in a predetermined wavelength region of a near infrared region to generate heat. As the photothermal conversion agent 123, for example, it is preferable to use an near infrared absorbing pigment that has an absorption peak in a wavelength range of 700 nm or more and 2000 nm or less and hardly has absorption in a visible region. Specific examples thereof include a compound having a phthalocyanine skeleton (a phthalocyanine-based pigment), a compound having a naphthalocyanine skeleton (a naphthalocyanine-based pigment), a compound having a squarylium skeleton (a squarylium-based pigment), a metal complex such as a dithio complex, a diimonium salt, an aminium salt, an inorganic compound, and the like. Examples of the inorganic compound include graphite, carbon black, metal powder particles, cobalt tetraoxide, iron oxide, chromium oxide, copper oxide, titanium black, a metal oxide such as ITO, a metal nitride such as niobium nitride, a metal carbide such as tantalum carbide, a metal sulfide, various types of magnetic powder, and the like. Aside from those described above, a compound having a cyanine skeleton (a cyanine-based pigment) with superior light resistance and superior heat resistance may be used.

As used herein, the superior light resistance refers to not decomposing during laser irradiation. The superior heat resistance means that a change equal to or more than 20% does not occur to a maximum absorption peak value of an absorption spectrum when being formed as a film together with a macromolecular material, for example, and being stored at 150° C. for 30 minutes, for example. Examples of such a compound having a cyanine skeleton include a compound containing, in a molecule, one or both of a counter ion of one of $SbF_6$, $PF_6$, $BF_4$, $ClO_4$, $CF_3SO_3$ and $(CF_3SO_3)_2N$ and a methine chain containing a five-membered ring or a six-membered ring.

Although the cyanine-based pigment is preferably provided with both of one of the above-described counter ions and a ring structure such as a five-membered ring and a six-membered ring in a methine chain, the provision of at least one of those allows sufficient light resistance and heat resistance to be secured. A material with superior light resistance and superior heat resistance does not decompose during laser irradiation, as described above. Examples of a way to confirm the superior light resistance include a method of measuring a peak change in an absorption spectrum at the time of a xenon lamp irradiation test. In a case where a change rate is 20% or less at the time of irradiation for 30 minutes, it is possible to judge that light resistance is favorable. Examples of a way to confirm the superior heat resistance include a method of measuring a peak change in an absorption spectrum at the time of storing at 150° C. In a case where a change rate is 20% or less after the 30-minute test, it is possible to judge that heat resistance is favorable.

As the macromolecular material 124, a material in which the coloring compound 121, the color developing/quenching agent 122, and the photothermal conversion agent 123 are easily dispersed evenly is preferable as illustrated in FIG. 2. In addition, the macromolecular material 124 preferably has high transparency to achieve high visibility of information to be written to the recording layer 12, and preferably has high solubility in an organic solvent.

In the recording layer 12 according to the present embodiment, the macromolecular material 124 preferably uses a macromolecular material that has solubility of 20 wt % or more at 25° C. or less and contains 0.5 wt % or less of chlorine atoms, fluorine atoms, and sulfur atoms in a molecule. In addition, as the macromolecular material 124, an organic material containing carbon, hydrogen, and oxygen or an organic material containing carbon, hydrogen, oxygen, and nitrogen is preferably used. Specifically, it is preferable to use an organic material having solubility of 20 wt % or more in cyclohexanone at 25° C. or less, an organic material having solubility of 20 wt % or more in 2-butanone at 25° C. or less, or an organic material having solubility of 20 wt % or more in toluene at 25° C. or less. An upper limit of solubility of the macromolecular material 124 is 80 wt % or less, for example. One reason for this is that it is difficult to handle a material having a too high solid content ratio for application of the recording layer 12 as a film. Further, the macromolecular material 124 preferably includes an organic material not releasing an acid having an acid dissociation constant (pKa) of 3.77 or less, for example. Specific examples of the macromolecular material 124 include polystyrene, polycarbonate, polyacrylonitrile, polyvinyl acetate, polyvinyl alcohol, polymethyl methacrylate, and the like. As the macromolecular material 124, one of the above-described organic materials may be used alone, or two or more of the above-described organic materials may be used in combination.

The recording layer 12 includes at least one of the above-described coloring compounds 121, at least one of the color developing/quenching agents 122, and at least one of the photothermal conversion agents 123. It is preferable for the coloring compound 121 and the color developing/quenching agent 122 included in the recording layer 12 to have a ratio between the coloring compound 121 and the color developing/quenching agent 122 being equal to 1:2 (weight ratio), for example. The photothermal conversion agent 123 is changed depending on the film thickness of the recording layer 12. Further, the recording layer 12 may include, in addition to the above-described materials, various additives such as a sensitizer and an ultraviolet absorbing agent, for example.

For example, the UV barrier layer 13 is preferably provided on the recording layer 12. The UV barrier layer 13 is formed including an ultraviolet absorbing agent, for example, and serves to absorb a ultraviolet ray (e.g., a wavelength of 10 nm or more and 400 nm or less) included in external light and the like to reduce exposure of the recording layer 12 to the ultraviolet ray. Examples of the ultraviolet absorbing agent include a benzotriazole-based compound having absorption in a wavelength region of 420 nm or less, and the like. The UV barrier layer 13 has a thickness of 1 μm or more and 50 μm or less, for example.

Further, for example, an oxygen barrier layer 14 is preferably provided on the recording layer 12, as illustrated in FIG. 3. The oxygen barrier layer 14 is formed including silicon oxide, aluminum oxide, or magnesium oxide, for example, and serves to reduce entry of oxygen or water included in outside air. As a material of the oxygen barrier layer 14, for example, it is preferable to use a material having an oxygen transmittance rate of 1 $cc/m^2$/day or less at 20° C. or less. It is more preferable to use a material having an oxygen transmittance rate of 0.01 $cc/m^2$/day or less. The oxygen barrier layer 14 has a thickness of 1 nm or more and 1 μm or less, for example; however, in terms of handling, the oxygen barrier layer 14 may be formed on any of various plastic film, and a total thickness including the plastic film is 10 μm or more and 100 μm or less, for example.

It is to be noted that although not illustrated, for example, a layer including a pressure-sensitive adhesive, an adhesive, or the like is provided on a lower surface of the recording layer 12, and the recording layer 12 is bonded on the support base 11 with the layer interposed therebetween.

1-2. Manufacturing Method of Reversible Recording Medium

The reversible recording medium 1 according to the present embodiment may be manufactured using an application method, for example. It is to be noted that the manufacturing method described below is merely exemplary, and any other method may be used for the manufacture.

First, for example, polyvinyl acetate is dissolved as a macromolecular material into a solvent (e.g., methyl ethyl ketone). The color developing/quenching agent, the coloring compound, and the photothermal conversion agent are added to the solution, and dispersed therein. This allows for obtainment of a reversible recording medium coating. Subsequently, the reversible recording medium coating is applied onto the support base 11 to have a thickness of 3 μm, for example, and is dried at 70° C., for example, to form the recording layer 12. Next, for example, the macromolecular material containing an UV absorbing agent is applied onto the recording layer 12 to have a thickness of 10 μm, and thereafter is dried to form the UV barrier layer 13. Thus, the reversible recording medium 1 illustrated in FIG. 1 is completed.

It is to be noted that a method other than the above-described application may be used to form the recording layer 12. For example, a film obtained by application to another base beforehand may be adhered onto the support base 11 with, for example, an adhesive film interposed therebetween to form the recording layer 12. Alternatively, the support base 11 may be immersed in the coating to form the recording layer 12.

1-3. Recording and Deletion Methods of Reversible Recording Medium

In the reversible recording medium 1 according to the present embodiment, recording and deletion may be performed as follows, for example.

First, the recording layer 12 is heated at a temperature enough to decolor a coloring compound, e.g., at a temperature of 120° C., to cause the recording layer 12 to be in a decolored state in advance. Next, a desired position of the recording layer 12 is irradiated with a near infrared ray having a wavelength and an output that are adjusted using, for example, a semiconductor laser, etc. This allows for heat generation of the photothermal conversion agent included in the recording layer 12, causing a coloring reaction (chromogenic reaction) between the coloring compound and the color developing/quenching agent, thus allowing the irradiated part to develop a color.

Meanwhile, in a case where a color-developed part is decolored, irradiation is performed with a near infrared ray at energy enough to cause the color-developed part to reach a decoloring temperature. This allows for heat generation of the photothermal conversion agent included in the recording layer 12, causing a decoloring reaction between the coloring compound and the color developing/quenching agent, thus allowing the irradiated part to be decolored and leading to deletion of a record. Further, in a case of deleting all of records formed in the recording layer 12 all at once, the reversible recording medium 1 is heated at a temperature enough to perform decoloring, e.g., at 120° C. This allows information recorded in the recording layer 12 to be deleted all at once. Thereafter, the above-described operation is performed, thus enabling repeated recording into the recording layer 12.

It is to be noted that the color-developed state and the decolored state are kept insofar as the above-described chromogenic reaction and decoloring reaction such as the near infrared irradiation and the heating are not performed.

1-4. Workings and Effects

As described above, development has been in progress in a display medium to be replaced with a printed matter, and attention is focused, as one example of the display medium, on a reversible recording medium that enables information to be recorded and deleted reversibly by heat. The reversible recording medium generally includes a coloring compound having an electron-donating property, a color developing/quenching agent having an electron-accepting property, and a matrix polymer. Further, addition of a photothermal conversion agent makes it possible for the reversible recording medium to perform recording and deletion by irradiation with light of a specific wavelength. The reversible recording medium is conceived to be applied to, in addition to printing on an IC card, a label, or the like, for example, decoration of a surface of a casing of an electronic apparatus, etc., or an interior, an exterior, or the like of a building.

For example, a leuco piment is used as a color developer for the reversible recording medium, but the leuco pigment is sensitive to light. For this reason, there is an issue that the leuco pigment is decomposed, for example, by light irradiation in a light resistance test to color a background (a color-undeveloped part), resulting in a deterioration in display quality. As a method of solving this issue, there is a method in which an ultraviolet absorbing layer or an oxygen block layer is provided on a recording layer including the leuco pigment. Alternatively, there are a method in which a light stabilizer is added to the recording layer and a protective layer provided on the recording layer, and a method using a macromolecular compound having a structure of a light stabilizer. However, it is difficult to sufficiently suppress coloring of a color-undeveloped part by the above-described methods, and further improvement is desired.

In contrast, in the reversible recording medium 1 according to the present embodiment, as the macromolecular material 124 that disperses the coloring compound 121, the color developing/quenching agent 122, and the photothermal conversion agent 123 included in the recording layer 12, an organic material that has solubility of 20 wt % or more and 80 wt % or less at 25° C. or less and contains 0.5 wt % or less of chlorine atoms, fluorine atoms, and sulfur atoms in a molecule is used. This makes it possible to reduce coloring of the color-undeveloped part by light irradiation such as a light resistance test.

As described above, in the reversible recording medium 1 according to the present embodiment, an organic material that has solubility of 20 wt % or more and 80 wt % or less at 25° C. or less and contains 0.5 wt % or less of chlorine atoms, fluorine atoms, and sulfur atoms in a molecule is dispersed in the macromolecular material 124 that disperses the coloring compound 121, the color developing/quenching agent 122, and the photothermal conversion agent 123. This allows for reduction of coloring of the color-undeveloped part by light irradiation such as a light resistance test. This consequently makes it possible to improve durability of display quality of the reversible recording medium 1.

Next, description is given of modification examples (modification examples 1 and 2) of the present disclosure. In the following, components similar to those of the above-described embodiment are denoted by the same reference numerals, and descriptions thereof are omitted where appropriate.

2. Modification Examples

2-1. Modification Example 1

FIG. 4 schematically illustrates a cross-sectional configuration of a reversible recording medium (a reversible recording medium 2) according to the modification example 1 of the present disclosure. The reversible recording medium 2 includes, for example, a recording layer 21 that is disposed on the support base 11 and allows for reversible change between a recorded state and a deleted state, and the recording layer 21 differs from the above-described embodiment in that the recording layer 21 has a stacked structure of a plurality of (three in this case) layers (a first layer 22, a second layer 23, and a third layer 24). Heat-insulating layers 25 and 26 are respectively provided between the layers 22 and 23 included in the recording layer 21 and between the layers 23 and 24 included in the recording layer 21.

2-1-1. Configuration of Reversible Recording Medium

The recording layer 21 is able to reversibly record and delete information by heat, and has, for example, a configuration in which the first layer 22, the second layer 23, and the third layer 24 are stacked in this order from the support base 11 side, as described above. The first layer 22, the second layer 23, and the third layer 24 are respectively formed by dispersing, in the macromolecular material 124, for example, the coloring compounds 121 (121A, 121B, and 121C) to be colored in colors different from each other, the color developing/quenching agents 122 (122A, 122B, and 122C) corresponding to the respective coloring compounds 121A, 121B, and 121C, and the photothermal conversion agents 123 (123A, 123B, and 123C) that absorb light rays of wavelength regions different from each other to generate heat.

Specifically, the first layer 22 includes, for example, a coloring compound (e.g., the coloring compound 121A) to be colored in a cyan color, a color developing/quenching agent (e.g., the color developing/quenching agent 122A) corresponding to the coloring compound, and a photothermal conversion agent (e.g. the photothermal conversion agent 123A) that absorbs an infrared ray of a wavelength $\lambda_1$, for example, to generate heat. The second layer 23 includes, for example, a coloring compound (e.g., the coloring compound 121B) to be colored in a magenta color, a color developing/quenching agent (e.g., the color developing/quenching agent 122B) corresponding to the coloring compound, and a photothermal conversion agent (e.g., the photothermal conversion agent 123B) that absorbs an infrared ray of a wavelength $\lambda_2$, for example, to generate heat. The third layer 24 includes, for example, a coloring compound (e.g., the coloring compound 121C) to be colored in a yellow color, a color developing/quenching agent (e.g., the color developing/quenching agent 122C) corresponding to the coloring compound, and a photothermal conversion agent (e.g., the photothermal conversion agent 123C) that absorbs an infrared ray of a wavelength $\lambda_3$, for example, to generate heat. The wavelengths $\lambda_1$, $\lambda_2$, and $\lambda_3$ differs from each other, thereby obtaining a display medium enabling multicolor display.

It is to be noted that it is preferable to select, for the photothermal conversion agents 123A, 123B, and 123C, a combination of materials having narrow photoabsorption bands that do not overlap one another in a range of 700 nm or more and 2000 nm or less. This makes it possible to selectively color or decolor a desired layer of the first layer 22, the second layer 23, and the third layer 24.

The first layer 22, the second layer 23, and the third layer 24 each preferably have a thickness of 1 μm or more and 20 μm or less, for example, and more preferably a thickness of 2 μm or more and 15 μm or less, for example. One reason for this is that, in a case where the layers 22, 23, and 24 each have a thickness of less than 1 μm, there is a possibility that sufficient color development density may not be obtained. Further, another reason for this is that, in a case where the layers 22, 23, and 24 each have a thickness of more than 20 μm, there is a possibility that a color-developing property and a decoloring property may be deteriorated due to larger amount of heat utilization of each of the layers 22, 23, and 24.

Further, similarly to the above-described recording layer 12, the first layer 22, the second layer 23, and the third layer 24 may each include, in addition to the above-described materials, various additives such as a sensitizer and an ultraviolet absorbing agent, for example.

Further, in the recording layer 21 according to the present modification example, the heat-insulating layers 25 and 26 are respectively provided between the first layer 22 and the second layer 23 and between the second layer 23 and the third layer 24. The heat-insulating layers 25 and 26 are each configured, for example, using a typical macromolecular material having light transmissivity. Specific examples of the material include polyvinyl chloride, polyvinyl acetate, a vinyl chloride-vinyl acetate copolymer, ethyl cellulose, polystyrene, a styrene-based copolymer, a phenoxy resin, polyester, aromatic polyester, polyurethane, polycarbonate, a polyacrylic ester, a polymethacrylic ester, an acrylic-based copolymer, a maleic acid-based polymer, polyvinyl alcohol, modified polyvinyl alcohol, hydroxy ethyl cellulose, carboxymethyl cellulose, starch, and the like. It is to be noted that the heat-insulating layers 25 and 26 may each include various additives such as an ultraviolet absorbing agent, for example.

In addition, the heat-insulating layers 25 and 26 may be each formed using an inorganic material having light transmissivity. For example, use of porous silica, porous alumina, porous titania, porous carbon, a composite thereof, or the like brings preferable effects such as lower thermal conductivity as well as a higher heat-insulating effect. The heat-insulating layers 25 and 26 may be formed by a sol-gel method, for example.

The heat-insulating layers 25 and 26 each preferably have a thickness of 3 μm or more and 100 μm or less, for example, and more preferably a thickness of 5 μm or more and 50 μm or less, for example. One reason for this is that, in a case where the heat-insulating layers 25 and 26 each have a too small thickness, a sufficient heat-insulating effect is not obtained, and, in a case where the heat-insulating layers 25 and 26 each have a too large thickness, thermal conductivity is deteriorated and light transmissivity is lowered upon uniformly heating the entire reversible recording medium 2.

The UV barrier layer 13 is preferably provided on the recording layer 21. Further, although not illustrated in FIG. 4, the oxygen barrier layer 14 may be further provided, similarly to FIG. 3.

2-1-2. Recording and Deletion Methods of Reversible Recording Medium

It is possible for the reversible recording medium 2 according to the present embodiment to perform recording and deletion as follows, for example. It is to be noted that description is given here of the recording layer 21 by exemplifying a case where the first layer 22, the second layer 23, and the third layer 24 to be colored, respectively, in the cyan color, the magenta color, and the yellow color described above are stacked.

First, heating is performed at a temperature enough to cause the recording layer 21 (the first layer 22, the second layer 23, and the third layer 24) to be decolored, e.g., at 120° C., to cause the recording layer 21 to be in a decolored state in advance. Next, any given part of the recording layer 21 is irradiated with an infrared ray having a wavelength and an output that are optionally selected using, for example, a semiconductor laser, etc. Here, in a case where the first layer 22 is caused to develop a color, irradiation is performed with the infrared ray of the wavelength $\lambda_1$ at energy enough to cause the first layer 22 to reach a color-developing temperature. This allows for heat generation of the photothermal conversion agent 123A included in the first layer 22, causing a coloring reaction (chromogenic reaction) between the coloring compound 121A and the color developing/quenching agent 122A, thus allowing the irradiated part to develop the cyan color. Likewise, in a case where the second layer 23 is caused to develop a color, irradiation is performed with the infrared ray of the wavelength $\lambda_2$ at energy enough to cause the second layer 23 to reach a color-developing temperature. In a case where the third layer 24 is caused to develop a color, irradiation is performed with the infrared ray of the wavelength $\lambda_3$ at energy enough to cause the third layer 24 to reach a color-developing temperature. This allows for heat generation of each of the photothermal conversion agents 123B and 123C included in the second layer 23 and the third layer 24, causing a coloring reaction between the coloring compound and the color developing/quenching agent, thus allowing the respective irradiated parts to develop the magenta color and the yellow color. In this manner, the irradiation of the respective optional parts with the infrared rays of the corresponding wavelengths makes it possible to record information (e.g., a full-color image).

Meanwhile, in a case where the first layer 22, the second layer 23, and the third layer 24 subjected to the color development as described above are each decolored, irradiation is performed with the infrared rays of the respective wavelengths corresponding to the layers 22, 23, and 24 at energy enough to cause the layers to reach a decoloring temperature. This allows for heat generation of each of the photothermal conversion agents 123A, 123B, and 123C included in the first layer 22, the second layer 23, and the third layer 24, causing a decoloring reaction each between the coloring compound 121A and the color developing/quenching agent 122A, between the coloring compound 121B and the color developing/quenching agent 122B, and between the coloring compound 121C and the color developing/quenching agent 122C, thus allowing the irradiated part to be decolored and leading to deletion of a record. Further, in a case of deleting all of records formed in the recording layer 21 all at once, the recording layer 21 is heated at a temperature enough to decolor all of the first layer 22, the second layer 23, and the third layer 24, e.g., at 120° C. This allows information recorded in the recording layer 21 (the first layer 22, the second layer 23, and the third layer 24) to be deleted all at once. Thereafter, the above-described operation is performed, thus enabling repeated recording into the recording layer 21.

2-1-3. Workings and Effects

As described above, in the present modification example, for example, three layers (the first layer 22, the second layer 23, and the third layer 24) are formed, which include the coloring compounds 121 (121A, 121B, and 121C) to be colored in the yellow color, the magenta color, and the cyan color, the respective corresponding color developing/quenching agents 122 (122A, 122B, and 122C), and the photothermal conversion agents 123 (123A, 123B, and 123C) having absorption wavelengths different from each other, and these layers are stacked. This makes it possible to provide the reversible recording medium 2 enabling multi-color recording and having high color development stability and high repeated drawability while maintaining color development sensitivity.

2-2. Modification Example 2

The above-described modification example 1 gives an example of providing a multilayer structure in which, as the recording layer 21, a plurality of layers (the first layer 22, the second layer 23, and the third layer 24) to be colored in colors different from each other are formed, and these layers are stacked. However, for example, even a single-layer structure allows for achievement of a reversible recording medium that enables multicolor display.

FIG. 5 illustrates a recording layer 31 that is formed, for example, by mixing three types of microcapsules 31C, 31M, and 31Y respectively including the coloring compounds 121 (121A, 121B, and 121C) to be colored in colors different from each other (e.g., a cyan color (C), a magenta color (M), and a yellow color (Y)), the color developing/quenching agents 122 (122A, 122B, and 122C) corresponding to the respective coloring compounds, and the photothermal conversion agents 123 (123A, 123B, and 123C) that absorb light in wavelength regions different from each other to generate heat. The recording layer 31 may be formed, for example, by dispersing the above-described microcapsules 31C, 31M, and 31Y in the macromolecular material 124 exemplified as the constituent material of the above-described recording layer 12 and applying the resultant dispersion onto the support base 11. It is to be noted that, for example, the material included in the above-described heat-insulating layers 25 and 26 is preferably used for the microcapsules 31C, 31M, and 31Y that contain the above-described materials.

As described above, in the present modification example, the coloring compounds 121 (121A, 121B, and 121C) to be colored in the yellow color, the magenta color, and the cyan color, the corresponding color developing/quenching agents 122 (122A, 122B, and 122C), and the photothermal conversion agents 123 (123A, 123B, and 123C) having absorption wavelengths different from each other are respectively encapsulated in the microcapsules 31C, 31M, and 31Y, and they are dispersed in the macromolecular material 124 to form the recording layer 31. This makes it possible to provide a reversible recording medium 3 having a single-layer structure and enabling multicolor display.

It is to be noted that the embodiment and the modification example 1 described above give examples in which the recording layer 12 and the recording layer 21 (the first layer 22, the second layer 23, and the third layer 24) are each formed using a single (one type of) coloring compound; however, this is not limitative. In the above-described reversible recording media 1 and 2, the recording layers 12 and 21 (the first layer 22, the second layer 23, and the third layer 24) may be each formed using a mixture of a plurality of types of coloring compounds to be colored in different colors.

It is difficult, in a reversible recording medium, to perform color reproduction of CMY (cyan, magenta, and yellow) according to Japan Color certification system, using a single coloring compound 121 (a leuco pigment). Further, the photothermal conversion agent 123 has a slight color tone, and thus the type and the content of the photothermal conversion agent 123 cause a color tone of each of the recording layers 12 and 21 to be slightly changed. Developing the coloring compound 121 for each and every slight change causes manufacturing efficiency to be significantly lowered.

Accordingly, forming the recording layer 12 and the recording layer 21 (the first layer 22, the second layer 23, and the third layer 24) by mixing a plurality of types of coloring compounds 121 (121A, 121B, and 121C) makes it possible to reproduce various colors including CMY according to the Japan Color certification system. For example, the cyan color may be reproduced by mixing a coloring compound to be colored in a blue color and a coloring compound to be colored in a green color at a predetermined rate. The magenta color may be reproduced by mixing a coloring compound to be colored in a red color and a coloring compound to be colored in an orange color at a predetermined rate.

3. Application Examples

Next, description is given of application examples of the reversible recording media (the reversible recording media 1 to 3) described in the embodiment and the modification examples 1 and 2 described above. However, a configuration of an electronic apparatus described below is merely exemplary, and the configuration may be varied appropriately. Any of the reversible recording media 1 to 3 is applicable to a portion of various electronic apparatuses or various clothing accessories. For example, the reversible recording media 1 to 3 is applicable to a portion of clothing accessories such as a watch (wristwatch), a bag, clothes, a hat, a helmet, headphones, glasses, and shoes, as a so-called wearable terminal. In addition, the type of the electronic apparatus is not particularly limited, and examples include a wearable display such as a head-up display or a head-mounted display, a portable device such as a portable music player or a portable game machine, a robot, a refrigerator, a washing machine, and the like. Further, it is also possible to apply, not only to the electronic apparatuses and the clothing accessories, but also to, as decorative members, the interior and exterior of automobiles, the interior and exterior such as walls of buildings, the exterior of furniture such as desks, and the like.

Application Example 1

FIGS. 6A and 6B each illustrate an appearance of an integrated circuit (IC) card with a rewritable function. The IC card has a card surface that serves as a printing surface 110, and includes, for example, a sheet-shaped reversible recording medium 1 or the like that is adhered thereto. The IC card allows for drawing on the printing surface 110 as well as rewriting and deletion thereof appropriately by disposing the reversible recording medium 1 or the like on the printing surface, as illustrated in FIGS. 6A and 6B.

Application Example 2

FIG. 7A illustrates a configuration of an appearance of a front surface of a smartphone, and FIG. 7B illustrates a configuration of an appearance of a rear surface of the smartphone illustrated in FIG. 7A. The smartphone includes, for example, a display part 210, a non-display part 220, and a casing 230. An entire surface, for example, of the casing 230 on the rear surface side is provided with, for example, the reversible recording medium 1 or the like as the exterior member of the casing 230. This allows for display of various color patterns as illustrated in FIG. 7B. It is to be noted that, although the smartphone is exemplified here, this is not limitative; it is also possible to apply, for example, to a notebook personal computer (PC), a tablet PC, or the like.

Application Example 3

FIGS. 8A and 8B each illustrate an appearance of a bag. The bag includes a storing part 310 and a handle 320, for example, and the reversible recording medium 1, for example, is attached to the storing part 310, for example. Various letters and patterns are displayed on the storing part 310 by means of the reversible recording medium 1, for example. In addition, the attachment of the reversible recording medium 1 or the like to a part of the handle 320 allows for display of various color patterns, and allows for change in design of the storing part 310, as illustrated, from the example of FIG. 8A to the example of FIG. 8B. It is also possible to use the reversible recording medium 1 or the like for the purpose of fashion in this manner.

Application Example 4

FIG. 9 illustrates a configuration example of a wristband able to record, in an amusement park, attraction-riding history, schedule information, and the like, for example. The wristband includes belt parts 411 and 412 and an information recording part 420. The belt parts 411 and 412 have a band shape, for example, and respective ends (not illustrated) thereof are configured to be connectable to each other. The reversible recording medium 1 or the like, for example, is adhered to the information recording part 420, and attraction-riding history MH2 and schedule information IS (IS1 to IS3) as described above and an information code CD, for example, are recorded. In the amusement park, a visitor is able to record the above-described information by waving the wristband over a drawing apparatus installed at every location of attraction-riding reservation spots.

A riding history mark MH1 indicates the number of attractions ridden by a visitor who wears the wristband in the amusement park. In this example, as the visitor rides the more attractions, the more star-shaped marks are recorded as the riding history mark MH1. It is to be noted that this is not limitative; for example, the color of the mark may be changed in accordance with the number of attractions ridden by the visitor.

The schedule information IS in this example indicates a schedule of the visitor. In this example, information about all of events including an event reserved by the visitor and an event to be held in the amusement park is recorded as the schedule information IS1 to IS3. Specifically, in this example, a title of an attraction (an attraction 201) of which riding is reserved by the visitor and scheduled time of the riding are recorded as the schedule information IS1. Further, an event such as a parade in the park and its scheduled starting time are recorded as the schedule information IS2. Furthermore, a restaurant reserved beforehand by a visitor and its scheduled mealtime are recorded as the schedule information IS3.

The information code CD records, for example, identification information IID that is used to identify the wristband and website information IWS.

Application Example 5

FIG. 10A illustrates an appearance of an upper surface of an automobile, and FIG. 10B illustrates an appearance of a side surface of the automobile. The reversible recording medium 1 or the like according to the present disclosure, as described above, may be provided, for example, to a vehicle body such as a bonnet 611, a bumper 612, a roof 613, a trunk cover 614, a front door 615, a rear door 616, or a rear bumper 617, thereby enabling various information and color patterns to be displayed in each part. In addition, the reversible recording medium 1 or the like is provided on the interior of the automobile, for example, on a steering wheel, a dashboard, or the like, thereby enabling various color patterns to be displayed.

Application Example 6

FIG. 11 illustrates an appearance of a cosmetic case. The cosmetic case includes, for example, a containing part 710 and a lid 720 covering the containing part 710. A reversible recording medium 100, for example, is adhered to the lid 720, for example. The lid 720 is decorated with, for example, a pattern or a color pattern as illustrated in FIG. 11, letters, or the like by means of the reversible recording medium 100. It is possible to rewrite and delete the pattern, the color pattern, the letters, or the like on the lid 720 by a drawing and deleting apparatus located in a store, for example. It is to be noted that it is possible to attach the reversible recording medium 100 not only to a front surface (the lid 720) of the cosmetic case but also a rear surface (the containing part 710) and the like.

4. Working Examples

Next, description is given in detail of working examples of the present disclosure.

Experiment 1

Experimental Example 1-1

First, a color developing/quenching agent was synthesized. Into a flask, 10 g of nonacosane acid ($C_{28}H_{57}COOH$), 4.6 g of triethylamine, and 50 ml of toluene were placed, and were heated to 40° C. Subsequently, 6.3 g of DPPA was added followed by refluxing, and thereafter the resultant was left to cool to room temperature. Next, a solvent was removed to give 16.2 g of octacosyl isocyanate. Subsequently, the 16.2 g of octacosyl isocyanate having been dissolved in tetrahydrofuran (THF) was added to 4.2 g of 4-aminosalicylic acid having been placed into another flask to perform heating under refluxing. The resultant was cooled to room temperature, and a precipitated solid was filtrated and washed. This gave a color developing/quenching agent A having $NHCOC_{28}H_{57}$ at an R position in the above-described formula (1).

Next, a reversible recording medium coating was prepared to form a recording layer as a film. Polystyrene was dissolved in methyl ethyl ketone (MEK), followed by further addition of the color developing/quenching agent A, and the resultant was dispersed using a rocking mill. A leuco pigment represented by the above-described formula (2) was added thereto, and the preparation was made to have a final ratio of the leuco pigment, the color developing/quenching agent, and polystyrene (an average molecular weight of 35000) being equal to 1:2:4. Further, a photothermal conversion material having a phthalocyanine skeleton was added to prepare the reversible recording medium coating. Subsequently, the reversible recording medium coating was applied as a film onto PET having a thickness of 50 μm using a wire bar to have a thickness of 3 μm, and the resultant film was dried at 70° C. for 30 minutes to give the recording layer (an experimental example 1-1). At this occasion, the preparation was made to allow a density of the photothermal conversion material included in the recording layer to have an absorbance value of 0.2 at a wavelength of 920 nm. Lastly, soluble polyester was applied onto the recording layer to have a thickness of 5 μm to 6 μm, followed by formation of a UV barrier layer with a transparent optical adhesive sheet (an optical clear adhesive: OCA) having 50 μm interposed therebetween.

Experimental Example 1-2

In an experimental example 1-2, a recording layer was produced using a method similar to that of the experimental example 1-1 described above except that as a macromolecular material, polystyrene was replaced by polycarbonate A.

Experimental Example 1-3

In an experimental example 1-3, a recording layer was produced using a method similar to that of the experimental example 1-1 described above except that as a macromolecular material, polystyrene was replaced by polyvinyl acetate.

Experimental Example 1-4

In an experimental example 1-4, a recording layer was produced using a method similar to that of the experimental example 1-1 described above except that as a macromolecular material, polystyrene was replaced by polymethyl methacrylate.

Experimental Example 1-5

In an experimental example 1-5, a recording layer was produced using a method similar to that of the experimental example 1-1 described above except that as a macromolecular material, polystyrene was replaced by polyvinyl alcohol.

Experimental Example 1-6

In an experimental example 1-6, a recording layer was produced using a method similar to that of the experimental example 1-1 described above except that as a macromolecular material, polystyrene was replaced by polyacrylonitrile.

Experimental Example 1-7

In an experimental example 1-7, production of a recording layer was tried using a method similar to that of the experimental example 1-1 described above except that as a macromolecular material, polystyrene was replaced by polyvinyl chloride, but the recording layer was not able to be formed as a film in the present experimental example.

Experimental Example 1-8

In an experimental example 1-8, production of a recording layer was tried using a method similar to that of the experimental example 1-1 described above except that as a macromolecular material, polystyrene was replaced by polycarbonate B, but the recording layer was not able to be formed as a film in the present experimental example.

Experimental Example 1-9

In an experimental example 1-9, a recording layer was produced using a method similar to that of the experimental example 1-1 described above except that as a macromolecular material, polystyrene was replaced by a polyvinyl chloride/polyvinyl acetate copolymer A. The density of chlorine (weight ratio of chlorine) included in the macromolecular material was 59.8 wt %.

Experimental Example 1-10

In an experimental example 1-10, a recording layer was produced using a method similar to that of the experimental example 1-1 described above except that as a macromolecular material, polystyrene was replaced by a polyvinyl chloride/polyvinyl acetate copolymer B. The density of chlorine (weight ratio of chlorine) included in the macromolecular material was 58.9 wt %.

Experimental Example 1-11

In the experimental example 1-10, a recording layer was produced using a method similar to that of the experimental example 1-1 described above except that as a macromolecular material, polystyrene was replaced by a polyvinyl chloride/polyvinyl acetate copolymer C. The density of chlorine (weight ratio of chlorine) included in the macromolecular material was 58.5 wt %.

Experimental Example 1-12

In the experimental example 1-10, a recording layer was produced using a method similar to that of the experimental example 1-1 described above except that as a macromolecular material, polystyrene was replaced by a polyvinyl chloride/polyvinyl acetate copolymer D. The density of chlorine (weight ratio of chlorine) included in the macromolecular material was 57.9 wt %.

Experimental Example 1-13

In the experimental example 1-10, a recording layer was produced using a method similar to that of the experimental example 1-1 described above except that as a macromolecular material, polystyrene was replaced by a polyvinyl chloride/polyvinyl acetate copolymer E. The density of chlorine (weight ratio of chlorine) included in the macromolecular material was 56.0 wt %.

Experimental Example 1-14

In an experimental example 1-14, a recording layer was produced using a method similar to that of the experimental example 1-1 described above except that as a macromolecular material, polystyrene was replaced by a mixture of vinyl acetate and the polyvinyl chloride/polyvinyl acetate copolymer E. The density of chlorine (weight ratio of chlorine) included in the macromolecular material was 36.3 wt %.

Experimental Example 1-15

In an experimental example 1-15, a recording layer was produced using a method similar to that of the experimental example 1-1 described above except that as a macromolecular material, polystyrene was replaced by a mixture of vinyl acetate and the polyvinyl chloride/polyvinyl acetate copolymer E. The density of chlorine (weight ratio of chlorine) included in the macromolecular material was 22.5 wt %.

Experimental Example 1-16

In an experimental example 1-16, a recording layer was produced using a method similar to that of the experimental example 1-1 described above except that as a macromolecular material, polystyrene was replaced by a mixture of vinyl acetate and the polyvinyl chloride/polyvinyl acetate copolymer E. The density of chlorine (weight ratio of chlorine) included in the macromolecular material was 10.6 wt %.

Experimental Example 1-17

In an experimental example 1-17, a recording layer was produced using a method similar to that of the experimental example 1-1 described above except that as a macromolecular material, polystyrene was replaced by a mixture of vinyl acetate and the polyvinyl chloride/polyvinyl acetate copolymer E. The density of chlorine (weight ratio of chlorine) included in the macromolecular material was 4.07 wt %.

Experimental Example 1-18

In an experimental example 1-18, a recording layer was produced using a method similar to that of the experimental example 1-1 described above except that as a macromolecular material, polystyrene was replaced by a mixture of vinyl acetate and the polyvinyl chloride/polyvinyl acetate copolymer E. The density of chlorine (weight ratio of chlorine) included in the macromolecular material was 0.5 wt %.

As for the experimental examples 1-1 to 1-18 described above, a color-developing property and light resistance of a color-developed part and a color-undeveloped part were evaluated, and results thereof are listed in Table 1 together with a configuration and solubility in 2-butanone of the macromolecular material used in each experimental example. Whether or not a color was developed, and light resistance of the color-developed part and the color-undeveloped part were evaluated using the following method. As for the solubility in 2-butanone, a case where the macromolecular material was dissolved at 20 wt % or more at 25° C. or less was ranked A, and a case where the macromolecular material was not dissolved at 20 wt % or more at 25° C. or less was ranked B.

(Evaluation of Color-Developing Property)

The recording layer provided with the UV barrier layer was irradiated with a laser (an output of 3 W) of a wavelength of 920 nm to develop a color. At this occasion, the recording layer not developing a color was considered as a layer not having a function as a recording layer, and was judged not to be usable as a recording layer. A spectrophotometer available from X-rite Inc. was used to measure color density (OD) of the recording layer for evaluation. A provisional color density target was an OD value of 1 or more, and an OD value of 1 or more was ranked A.

(Evaluation of Light Resistance of Color-Developed Part and Color-Undeveloped Part)

The color-developed part and the color-undeveloped part were formed in the recording layer provided with the UV barrier layer used for evaluation of the color-developing property, and a light resistance test was executed using a light-resistance tester Q-SUN available from Q-Lab Corporation under conditions of 60 $W/m^2$ and a bath temperature of 20° C. As for evaluation of light resistance of the color-developed part, the color density of the color-developed part was first measured, and after 24 hours, the color density was measured again to check an attenuation degree of the color density. A case where a decrease rate of the color density after 24 hours was 10% or less was ranked A, and a case where the decrease rate of the color density after 24 hours was less than 10% was ranked B. As for evaluation of light resistance of the color-undeveloped part, ΔE* represented by the following formula (1) representing a color shift from an initial stage was used as an index, and a case where a value of ΔE* after 24 hours was 3.2 or less indicating grade A tolerance was ranked A, and a case where the value of ΔE* after 24 hours exceeded 3.2 was ranked B.

(Math. 1)

$$\Delta E^*=\sqrt{}(^*\text{initial stage}-L^*\text{after 24 hours})^2+(a^*\text{initial stage}-a^*\text{after 24 hours})^2+(b^*\text{initial stage}-b^*\text{after 24 hours})^2 \quad (1)$$

TABLE 1

| | Macromolecular Material | | | | Light Resistance | |
|---|---|---|---|---|---|---|
| | Combination | Weight Ratio of Cl (%) | Solubility | Color-developing Property | Color-developed Part | Color-undeveloped Part |
| Experimental Example 1-1 | polystyrene | 0 | A | A | A | A |
| Experimental Example 1-2 | polycarbonate A | 0 | A | A | A | A |
| Experimental Example 1-3 | polyvinyl acetate | 0 | A | A | A | A |
| Experimental Example 1-4 | polymethyl metacrylate | 0 | A | A | A | A |
| Experimental Example 1-5 | polyvinyl alcohol | 0 | A | A | A | A |
| Experimental Example 1-6 | polyacrylonitrile | 0 | A | A | A | A |
| Experimental Example 1-7 | polyvinyl chloride | 60 | B | — | — | — |
| Experimental Example 1-8 | polycarbonate B | 0 | B | — | — | — |
| Experimental Example 1-9 | polyvinyl chloride-polyvinyl acetate copolymer A | 59.8 | B | — | — | — |
| Experimental Example 1-10 | polyvinyl chloride-polyvinyl acetate copolymer B | 58.9 | A | A | A | B |
| Experimental Example 1-11 | polyvinyl chloride-polyvinyl acetate copolymer C | 58.5 | A | A | A | B |
| Experimental Example 1-12 | polyvinyl chloride-polyvinyl acetate copolymer D | 57.9 | A | A | A | B |
| Experimental Example 1-13 | polyvinyl chloride-polyvinyl acetate copolymer E | 56.0 | A | A | A | B |

TABLE 1-continued

| | Macromolecular Material | | | | Light Resistance | |
|---|---|---|---|---|---|---|
| | Combination | Weight Ratio of Cl (%) | Solubility | Color-developing Property | Color-developed Part | Color-undeveloped Part |
| Experimental Example 1-14 | polyvinyl acetate and polyvinyl chloride-polyvinyl acetate copolymer E | 36.3 | A | A | A | B |
| Experimental Example 1-15 | polyvinyl acetate and polyvinyl chloride-polyvinyl acetate copolymer E | 22.5 | A | A | A | B |
| Experimental Example 1-16 | polyvinyl acetate and polyvinyl chloride-polyvinyl acetate copolymer E | 10.6 | A | A | A | B |
| Experimental Example 1-17 | polyvinyl acetate and polyvinyl chloride-polyvinyl acetate copolymer E | 4.07 | A | A | A | B |
| Experimental Example 1-18 | polyvinyl acetate and polyvinyl chloride-polyvinyl acetate copolymer E | 0.5 | A | A | A | A |

Table 1 indicates that in the experimental examples 1-7, 1-8, and 1-9 respectively using, as the macromolecular material, polyvinyl chloride, polycarbonate B, and the polyvinyl chloride-polyvinyl acetate copolymer A having low solubility in an organic solvent (2-butanone), the recording layer was not able to be formed. The polyvinyl chloride-polyvinyl acetate copolymers B to E used in the experimental examples 1-10 to 1-17 has high solubility in 2-butanone. However, sufficient light resistance of the color-undeveloped part was not achieved. It is considered that this is caused by the content of chlorine atoms contained in the above-described macromolecular material. In a case where many chlorine atoms are contained in the macromolecular material, bonding in the macromolecular material is activated by light to release chlorine atoms as hydrochloric acid. The released hydrochloric acid attacks the leuco pigment in the color-undeveloped part. Thus, it is speculated that the leuco pigment in the color-undeveloped part load-reversibly develops a color to color the color-undeveloped part. It is to be noted that in all the experimental examples 1-14 to 1-18, the mixture of polyvinyl acetate and the polyvinyl chloride-polyvinyl acetate copolymer E was used as the macromolecular material, and in the experimental example 1-18, a favorable result was achieved. A conceivable reason for this is that the content of chlorine atoms contained in the used macromolecular material was small. For this reason, it can be said that the content of chlorine atoms contained in the macromolecular material is preferably 0.5 wt % or less. In addition, irreversible color development of the leuco pigment described above is not limited to only hydrochloric acid. For example, a similar reaction occurs in sulfuric acid and hydrofluoric acid. Accordingly, it can be said that the contents of sulfur atoms and fluorine atoms in the macromolecular material are also preferably small, and are preferably 0.5 wt % or less, similarly to the chlorine atoms.

In addition, although not listed in Table 1, a similar light resistance test was performed without providing the UV barrier layer, and the value of $\Delta E^*$ exceeded 3.2 in all the experimental examples 1-1 to 1-18. It was appreciated, from this result, that it was preferable to form the UV barrier layer on the recording layer. In addition, it was appreciated that providing an oxygen barrier layer on the recording layer made it possible to improve storage stability under high temperature and high humidity conditions. In addition, the oxygen barrier layer makes it possible to reduce entry of a material as a source of active oxygen into the recording layer in the light resistance test; therefore, it is preferable to provide the oxygen barrier layer together with the UV barrier layer.

Although the present disclosure has been described above with reference to the embodiment and the modification examples 1 and 2, the present disclosure is not limited to aspects described in the embodiment and the like described above, and may be modified in a variety of ways. For example, not all the components described in the embodiment and the like described above may necessarily be provided, and any other component may be further included. Moreover, the materials and the thicknesses of the components described above are merely examples, and are not limited to those described herein.

Further, although the modification example 2 described above gives an example in which the microcapsule is used to perform multicolor display in the single-layer structure, this is not limitative; for example, it is also possible to use a fiber-shaped three-dimensional stereoscopic structure to perform the multicolor display. For example, the fiber to be used here preferably has a so-called core-sheath structure configured by a core part that includes the coloring compound to be colored in a desired color, the color developing/quenching agent corresponding thereto, and the photothermal conversion material, and by a sheath part that coats the core part and includes a heat-insulating material. By forming the three-dimensional stereoscopic structure using a plurality of types of fibers having the core-sheath structure and including respective coloring compounds to be colored in different colors, it becomes possible to produce a reversible recording medium that enables multicolor display.

Furthermore, although the embodiment and the like described above give an example in which the laser is used to perform color development and decoloring of respective recording layers, this is not limitative. For example, a thermal head may also be used to perform the color development and the decoloring.

It is to be noted that the effects described in the present specification are merely exemplary and not limitative, and may have other effects.

It is to be noted that the present disclosure may have the following configurations.

(1)

A reversible recording medium including:

a recording layer including a coloring compound having an electron-donating property, a color developing/ quenching agent having an electron-accepting property, a photothermal conversion agent, and a macromolecular material; and an ultraviolet absorbing layer provided on the recording layer, the macromolecular material including an organic material that has solubility of 20 wt % or more and 80 wt % or less at 25° C. or less and contains 0.5 wt % or less of chlorine atoms, fluorine atoms, and sulfur atoms in a molecule.

(2)

The reversible recording medium according to (1), in which the recording layer includes, as the macromolecular material, an organic material not releasing an acid having an acid dissociation constant (pKa) of 3.77 or less.

(3)

The reversible recording medium according to (1) or (2), in which the recording layer includes, as the macromolecular material, at least one of polystyrene, polycarbonate, polyacrylonitrile, polyvinyl acetate, polyvinyl alcohol, or polymethyl methacrylate.

(4)

The reversible recording medium according to any one of (1) to (3), in which the macromolecular material contains carbon, hydrogen, and oxygen.

(5)

The reversible recording medium according to any one of (1) to (4), in which the macromolecular material contains carbon, hydrogen, oxygen, and nitrogen.

(6)

The reversible recording medium according to any one of (1) to (5), in which the macromolecular material includes an organic material having solubility of 20 wt % or more in cyclohexanone at 25° C. or less.

(7)

The reversible recording medium according to any one of (1) to (6), in which the macromolecular material includes an organic material having solubility of 20 wt % or more in 2-butanone at 25° C. or less.

(8)

The reversible recording medium according to any one of (1) to (6), in which the macromolecular material includes an organic material having solubility of 20 wt % or more in toluene at 25° C. or less.

(9)

The reversible recording medium according to any one of (1) to (8), further including an oxygen barrier layer on the recording layer.

(10)

The reversible recording medium according to any one of (1) to (9), in which the recording layer includes a layer including a pressure-sensitive adhesive or an adhesive on a surface opposite to a surface provided with the ultraviolet absorbing layer.

(11)

The reversible recording medium according to any one of (1) to (10), in which the recording layer includes, as the color developing/quenching agent, at least one compound represented by the following general formula (1):

[Chem. 1]

(1)

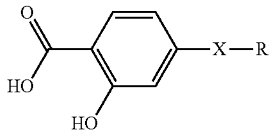

(X is one of —NHCO—, —CONH—, —NHCONH—, —CONHCO—, —NHNHCO—, —CONHNH—, —CONHNHCO—, —NHCOCONH—, —NHCONHCO—, —CONHCONH—, —NHNHCONH—, —NHCONHNH—, —CONHNHCONH—, —NHCONHNHCO—, and —CONHNHCONH—, and R is a linear hydrocarbon group having 25 to 34 carbon atoms.)

(12)

The reversible recording medium according to any one of (1) to (11), in which the recording layer includes a plurality of layers.

(13)

The reversible recording medium according to (12), in which the recording layer includes a first layer and a second layer as the plurality of layers, and the first layer and the second layer include respective photothermal conversion agents having absorption wavelengths different from each other.

(14)

An exterior member having at least one surface provided with a reversible recording medium on a support base, the reversible recording medium including:

a recording layer including a coloring compound having an electron-donating property, a color developing/quenching agent having an electron-accepting property, a photothermal conversion agent, and a macromolecular material; and an ultraviolet absorbing layer provided on the recording layer, the macromolecular material including an organic material that has solubility of 20 wt % or more and 80 wt % or less at 25° C. or less and contains 0.5 wt % or less of chlorine atoms, fluorine atoms, and sulfur atoms in a molecule.

This application claims the benefit of Japanese Priority Patent Application JP2018-123919 filed with the Japan Patent Office on Jun. 29, 2018, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A reversible recording medium comprising:

a recording layer including a coloring compound having an electron-donating property, a color developing/quenching agent having an electron-accepting property, a photothermal conversion agent, and a macromolecular material;

an oxygen barrier layer on the recording layer, wherein the oxygen barrier layer includes silicon oxide, aluminum oxide or magnesium oxide; and an ultraviolet absorbing layer provided on the recording layer, the macromolecular material including an organic material that has solubility of 20 wt % or more and 80 wt % or less at 25° C. or less and includes 0.5 wt % of chlorine atoms in a molecule.

2. The reversible recording medium according to claim 1, wherein the organic material does not release an acid having an acid dissociation constant (pKa) of 3.77 or less.

3. The reversible recording medium according to claim 1, wherein the macromolecular material includes at least one of polystyrene, polycarbonate, polyacrylonitrile, polyvinyl acetate, polyvinyl alcohol, or polymethylmethacrylate.

4. The reversible recording medium according to claim 1, wherein the macromolecular material includes carbon, hydrogen, and oxygen.

5. The reversible recording medium according to claim 1, wherein the macromolecular material includes carbon, hydrogen, oxygen, and nitrogen.

6. The reversible recording medium according to claim 1, wherein the organic material having solubility of 20 wt % or more in cyclohexanone at 25° C. or less.

7. The reversible recording medium according to claim 1, wherein the organic material having solubility of 20 wt % or more in 2-butanone at 25° C. or less.

8. The reversible recording medium according to claim 1, wherein the organic material having solubility of 20 wt % or more in toluene at 25° C. or less.

9. The reversible recording medium according to claim 1, further comprising a layer including a pressure-sensitive adhesive or an adhesive on a surface of the recording layer opposite to a surface provided with the ultraviolet absorbing layer.

10. The reversible recording medium according to claim 1, wherein the recording layer includes, as the color developing/quenching agent, at least one compound represented by the following general formula (1):

(1)

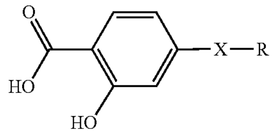

X is one of —NHCO—, —CONH—, —NHCONH—, —CONHCO—, —NHNHCO—, —CONHNH—, —CONHNHCO—, —NHCOCONH—, —NHCONHCO—, —CONHCONH—, —NHNHCONH—, —NHCONHNH—, —CONHNHCONH—, —NHCONHNHCO—, and —CONHNHCONH—, and R is a linear hydrocarbon group having 25 to 34 carbon atoms.

11. The reversible recording medium according to claim 1, wherein the recording layer includes a plurality of layers.

12. The reversible recording medium according to claim 11, wherein the recording layer includes a first layer and a second layer as the plurality of layers, and the first layer and the second layer include respective photothermal conversion agents having absorption wavelengths different from each other.

13. The reversible recording medium according to claim 1, wherein the macromolecular material includes polyvinyl acetate and polyvinyl chloride-polyvinyl acetate copolymer.

14. An exterior member comprising a support base and a reversible recording medium on at least one surface of the support base, wherein the reversible recording medium comprising:

a recording layer including a coloring compound having an electron-donating property, a color developing/quenching agent having an electron-accepting property, a photothermal conversion agent, and a macromolecular material;

an oxygen barrier layer on the recording layer, wherein the oxygen barrier layer includes silicon oxide, aluminum oxide or magnesium oxide; and an ultraviolet absorbing layer provided on the recording layer, the macromolecular material including an organic material that has solubility of 20 wt % or more and 80 wt % or less at 25° C. or less and includes 0.5 wt % of chlorine atoms in a molecule.

15. The reversible recording medium according to claim 14, wherein the macromolecular material includes polyvinyl acetate and polyvinyl chloride-polyvinyl acetate copolymer.

* * * * *